United States Patent
Iranpour

(10) Patent No.: US 8,947,976 B2
(45) Date of Patent: Feb. 3, 2015

(54) HARMONIC ATTENUATION USING MULTIPLE SWEEP RATES

(75) Inventor: Kambiz Iranpour, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 1323 days.

(21) Appl. No.: 12/245,503

(22) Filed: Oct. 3, 2008

(65) Prior Publication Data

US 2010/0085837 A1 Apr. 8, 2010

(51) Int. Cl.
*G01V 1/00* (2006.01)
*G01V 1/37* (2006.01)

(52) U.S. Cl.
CPC ...... *G01V 1/005* (2013.01); *G01V 1/37* (2013.01); *G01V 2210/32* (2013.01)
USPC .......................................... 367/59

(58) Field of Classification Search
CPC ........ G01V 1/005; G01V 1/37; G01V 210/32
USPC ........................................ 367/41, 59; 702/14
See application file for complete search history.

(56) References Cited

U.S. PATENT DOCUMENTS

| | | | |
|---|---|---|---|
| 4,729,066 A * | 3/1988 | Nelson et al. | 367/23 |
| 5,005,665 A * | 4/1991 | Cheung | 181/101 |
| 5,020,538 A * | 6/1991 | Morgan et al. | 600/409 |
| 6,055,482 A * | 4/2000 | Sudhakar et al. | 702/16 |
| 6,687,619 B2 | 2/2004 | Moerig et al. | |
| 7,505,360 B2 * | 3/2009 | Bisley et al. | 367/24 |
| 2005/0128874 A1* | 6/2005 | Herkenhoff et al. | 367/56 |
| 2006/0164916 A1* | 7/2006 | Krohn et al. | 367/41 |
| 2008/0137476 A1* | 6/2008 | Eick et al. | 367/38 |

OTHER PUBLICATIONS

J.E. Martin, Simultaneous Vibroseis Recording, Geophysical Prospecting, 1993, pp. 943-967, vol. 41.

* cited by examiner

*Primary Examiner* — Krystine Breier

(57) ABSTRACT

A technique includes generating seismic sweep sequences. Each of the seismic sweep sequences has an associated sweep rate. The technique includes varying the sweep rates to reduce harmonic distortion present in a composite seismic measurement produced in response to the sweep sequences.

19 Claims, 10 Drawing Sheets

US 8,947,976 B2

HARMONIC ATTENUATION USING MULTIPLE SWEEP RATES

BACKGROUND

The invention generally relates to harmonic attenuation using multiple sweep rates.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones) and others are sensitive to particle motion (e.g., geophones). Industrial surveys may deploy only one type of sensors or both. In response to the detected seismic events, the sensors generate electrical signals to produce seismic data. Analysis of the seismic data can then indicate the presence or absence of probable locations of hydrocarbon deposits.

One type of seismic source is an impulsive energy source, such as dynamite for land surveys or a marine air gun for marine surveys. The impulsive energy source produces a relatively large amount of energy that is injected into the earth in a relatively short period of time. Accordingly, the resulting data generally has a relatively high signal-to-noise ratio, which facilitates subsequent data processing operations. The use of an impulsive energy source for land surveys may pose certain safety and environmental concerns.

Another type of seismic source is a seismic vibrator, which is used in connection with a "vibroseis" survey. For a seismic survey that is conducted on dry land, the seismic vibrator imparts a seismic source signal into the earth, which has a relatively lower energy level than the signal that is generated by an impulsive energy source. However, the energy that is produced by the seismic vibrator's signal lasts for a relatively longer period of time.

SUMMARY

In an embodiment of the invention, a technique includes generating seismic sweep sequences. Each of the seismic sweep sequences has an associated sweep rate. The technique includes varying the sweep rates to reduce harmonic distortion present in a composite seismic measurement produced in response to the sweep sequences.

In another embodiment of the invention, a technique includes receiving seismic data that is indicative of seismic measurements acquired in response to a plurality of seismic sweep sequences. Each of the seismic sweep sequences has an associated sweep rate, and the sweep rates are varied. The technique includes processing the seismic measurements to produce a composite seismic measurement and using the varied sweep rates to suppress harmonic distortion otherwise present in the composite seismic measurement.

In yet another embodiment of the invention, a system includes at least one actuator and a controller. The actuator(s) generates seismic sweep sequences in a survey. The controller controls the actuator(s) to vary sweep rates of the sweep sequences.

Advantages and other features of the invention will become apparent from the following drawing, description and claims.

DETAILED DESCRIPTION

Figure 1:
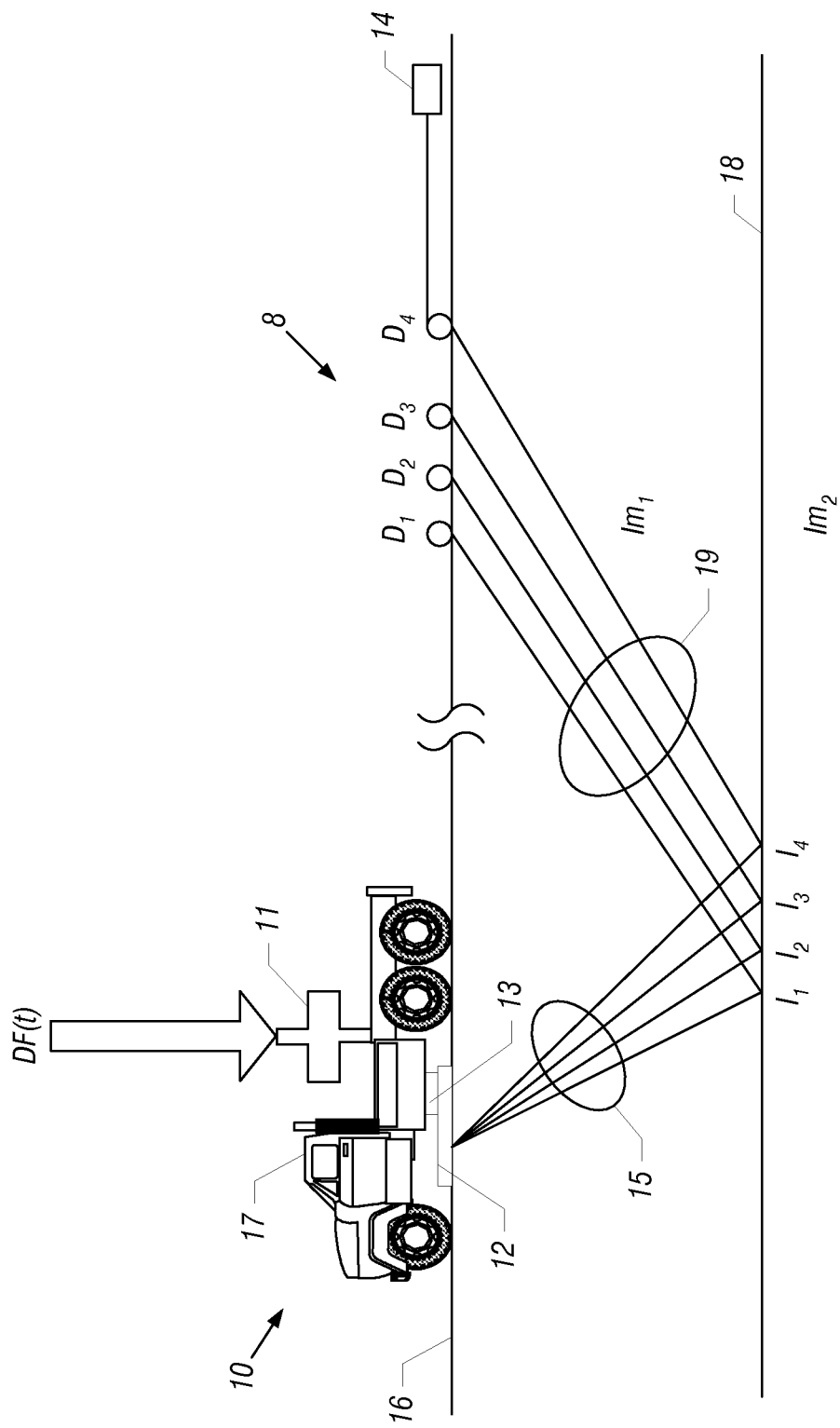
FIG. 1 is a schematic diagram of a vibroseis acquisition system according to an embodiment of the invention.

Referring to FIG. 1, an exemplary land-based vibroseis acquisition system 8 in accordance with embodiments of the invention includes at least one surface-located seismic vibrator 10; surface-located geophones $D_1$, $D_2$, $D_3$ and $D_4$; and a data acquisition system 14. As part of operations associated with a vibroseis survey, the seismic vibrator 10 generates vibroseis seismic sweep sequences. More specifically, FIG. 1 depicts a subsurface sweep sequence signal 15 that is generated by the vibrator 10 during the survey for purposes of injecting a vibroseis sweep sequence into the earth. An interface 18 between subsurface impedances $Im_1$ and $Im_2$ reflects the signal 15 at points $I_1$, $I_2$, $I_3$ and $I_4$ to produce a reflected signal 19 that is detected by the geophones $D_1$, $D_2$, $D_3$ and $D_4$, respectively. The data acquisition system 14 gathers the raw seismic data acquired by the geophones $D_1$, $D_2$, $D_3$ and $D_4$, and the raw seismic data may be processed to yield information about subsurface reflectors and the physical properties of subsurface formations.

For purposes of generating the signal 15, the seismic vibrator 10 may contain an actuator (a hydraulic or electromagnetic actuator, as examples) that drives a vibrating element 11 in response to a sweep sequence pilot signal (called "DF(t)" in FIG. 1). More specifically, the DF(t) signal may be a sinusoid whose amplitude and frequency are changed during the generation of the sweep sequence. Because the vibrating element 11 is coupled to a base plate 12 that is in contact with the earth surface 16, the energy from the element 11 is coupled to the earth to produce the signal 15.

Among its other features, the seismic vibrator 10 may include a signal measuring apparatus 13, which includes sensors (accelerometers, for example) to measure the signal 15 (i.e., to measure the output force of the seismic vibrator 10). As depicted in FIG. 1, the seismic vibrator 10 may be mounted on a truck 17, an arrangement that enhances the vibrator's mobility.

The vibrating element 11 contains a reaction mass that oscillates at a frequency and amplitude that is controlled by the DF(t) pilot signal: the frequency of the DF(t) signal sets the frequency of oscillation of the reaction mass; and the amplitude of the oscillation, in general, is controlled by a magnitude of the DF(t) signal. During the generation of the sweep sequence, the frequency of the DF(t) signal transitions (and thus, the oscillation frequency of the reaction mass transitions) over a range of frequencies, one frequency at time. The amplitude of the DF(t) signal may be linearly or non-linearly varied during the generation sweep sequence pursuant to a designed amplitude-time envelope.

The injected sweep sequence generally follows the DF(t) pilot signal. However, the seismic vibrator 10 also emits unwanted harmonic energy into the sweep sequence, and as a result, harmonic energy appears in the measurement recorded by the geophones $D_1$, $D_2$, $D_3$ and $D_4$.

It is noted that unlike the seismic vibrator 10, a seismic vibrator may alternatively be constructed to be located in a borehole, in accordance with other embodiments of the invention. Thus, seismic sensors, such as geophones, may alternatively be disposed in a borehole to record measurements produced by energy that is injected by the borehole-disposed vibrator. Although specific examples of surface-located seismic vibrators and seismic sensors are set forth herein, it is understood that the seismic sensors and/or the seismic vibrator may be located downhole.

A vibroseis survey in accordance with embodiments of the invention involves generating multiple seismic sweep sequences and acquiring corresponding measurements in response to the sweep sequences. The frequency spectra of each measurement typically contains energy related to the detected main event as well as harmonic energy. For purposes of improving the overall signal-to-noise ratio (SNR) of the measured seismic data, the measurements are processed to suppress, or attenuate, the harmonic content, and as described herein, the harmonic attenuation is significantly aided by the manner in which the sweep sequences are generated. More specifically, in accordance with embodiments of the invention described herein, the sweep rates of the seismic sweep sequences are purposely varied to distribute the harmonic energy in the measurements in a manner that facilitates removal of the harmonic energy.

For a fixed linear sweep where the sweep rate stays constant during the sweep, the sweep rate is the bandwidth of the sweep sequence divided by the sequence's duration, or length.

For nonlinear sweeps, the sweep rate changes during the sweep. One way to vary the sweep rates is to generate sweep sequences to maintain the sweep length, the start frequency and the stop frequency constant, while generating a variable sweep rate as a function of time during each sweep. In a time-frequency axes plot for this example, all of the sweeps are represented by different nonlinear curves, which are connected at the same two starting and ending points (t0, f0) and (t1,f1). For this example, "f0" is the starting frequency, "f1" is the ending frequency, "t0" is the starting time and "t1" is the ending time.

By varying the sweep rates of the injected sweep sequences, the harmonics in the corresponding measurements are time shifted relative to each other and thus, appear at different lag times in the measurements. The time shifted relationship of the harmonics, in turn, facilitates suppression of the harmonics when the measurements are further processed, as described below.

Each sweep sequence produces an amplitude and frequency varying signal that propagates into the ground and is modified in amplitude and phase from the pilot sweep signal due to the interaction of the vibrator, the ground and the design of the vibrator itself, and these modifications introduce harmonics into the recorded measurements. It has been discovered that when the corresponding intended pilot sweep signals are correlated with the recorded signal(s), the reflections originating from the same place in the record contain harmonics that are shifted in time due to the different sweep rates. Therefore, by stacking multiple correlated records that each have a different associated sweep rate to form a composite measurement, the harmonics are attenuated while the SNR is increased. As described below in connection with FIGS. 8-11, simulations reveal that the sweep rate changes may be small in magnitude, as large rate changes are not needed for the harmonic attenuation technique that is described herein to be successful.

It is noted that the sweep rates may be random or may be deterministically determined for purposes of optimizing harmonic attenuation in particular time windows. Additionally, techniques such as simulated annealing, evolutionary algorithms or any other random search optimization technique may also be applied for purposes of determining optimized sweep rate distributions at the one or more vibrating points from which the sweep sequences are generated.

The sweep rate may be established and the sweep rates may be varied, in a number of different ways, depending on the particular embodiment of the invention. As an example, in accordance with some embodiments of the invention, the sweep rate may be varied by changing the duration, or length, of the sweep sequence while maintaining the start and end frequencies of the sweep constant. As another example, in accordance with other embodiments of the invention, the sweep rate may be varied by changing the start frequency or end frequency of the sweep sequence or, alternatively, (as yet another example) by changing the sweep length, the end frequency and the start frequency. Non-linear sweep sequences may be used, which have different shapes in the time-frequency domain for purposes of varying the sweep rate. Thus, many variations are contemplated and are within the scope of the appended claims.

For purposes of clarity, it is assumed below that unless otherwise noted, the end and start frequencies of the sweep sequences are kept constant, and the length is changed slightly for each sweep sequence.

Figure 2:
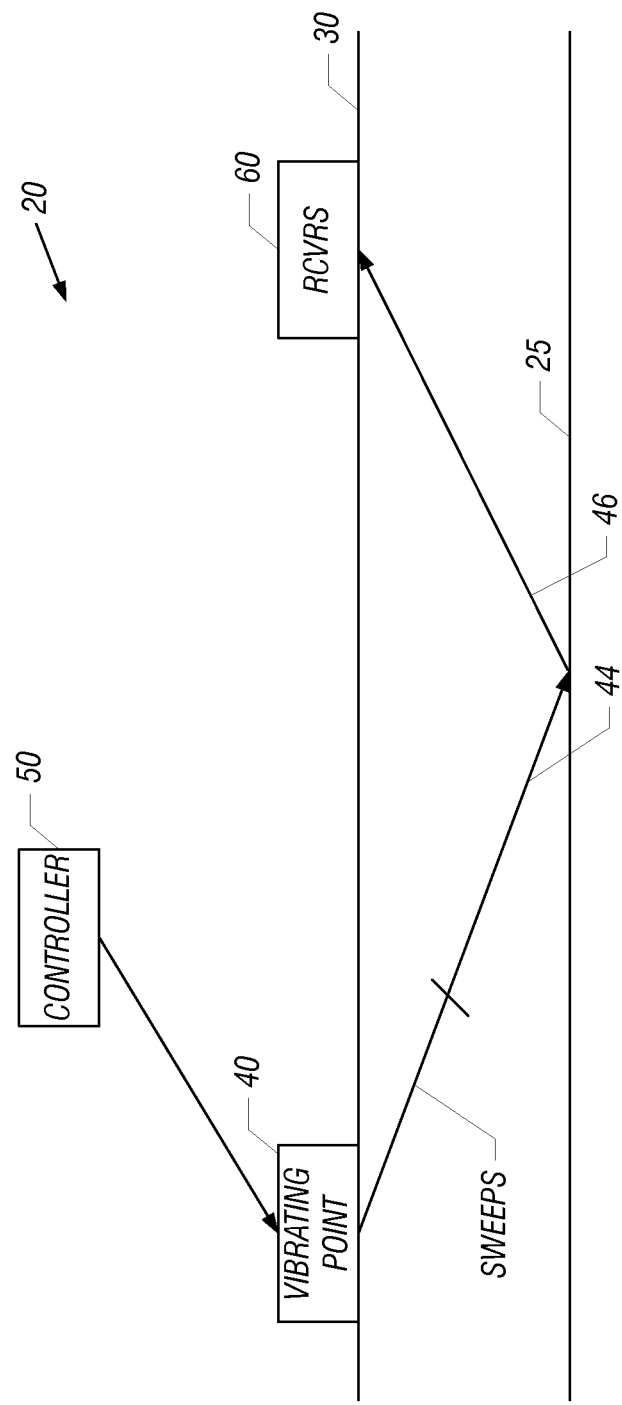
FIG. 2 is a single vibrating point-based vibroseis acquisition system according to an embodiment of the invention.

Referring to FIG. 2, in accordance with some embodiments of the invention, a vibroseis acquisition system 20 has a single vibrating point 40 that injects sweep sequences into the earth 30. More specifically, each sweep sequence is injected via an amplitude and frequency varying signal 44 that reflects off of a subsurface 25 and produces a corresponding signal 46 that is sensed by receivers 60 (disposed at the Earth's surface 30, for example) to form corresponding seismic measurement. As an example, the vibrating point 40 may be formed by a seismic vibrator truck. However, as noted above, the vibrating point 40 may alternatively be formed by a downhole vibrator. Thus, many variations are contemplated and are within the scope of the appended claims.

The generation of the sweep sequences at the vibrating point 40 is regulated by a controller 50 (one or more microprocessors and/or microcontrollers, as a non-limiting examples). In general, the controller 50 controls the vibrating point 40 so that the sweep sequences that are generated at the point 40 are substantially identical except for the durations, or lengths, of the sequences; and due to this purposefully introduced variation, the sweep sequences have different corresponding sweep rates.

In general, the controller 50 changes the sweep rate slightly for each sweep sequence 44. The controller 50 may randomly or pseudo randomly vary the sweep lengths in accordance with embodiments of the invention. Randomizing the sweep length by a small difference (relative to the sweep length), such as a difference that varies over a time interval that is one to ten percent of the average sweep length (as a non-limiting example), maintains the correlation peak that corresponds to a reflection at the same lag time and randomizes where the harmonics appear in the correlated domain. In accordance with some embodiments of the invention, the acquired measurements may be combined via a simple stacking for purposes of attenuating the harmonics. However, a further noise attenuation technique may be applied. For example, a least squares method may be applied to attenuate the out of phase harmonics.

Figure 3:
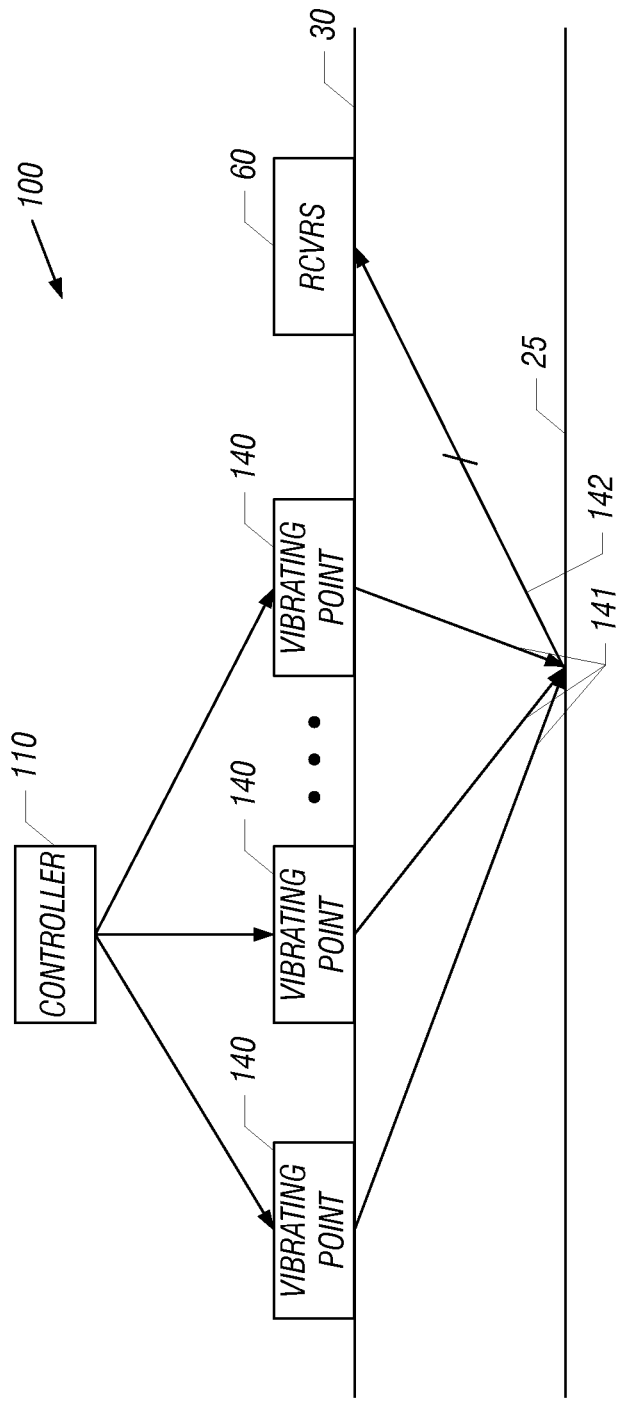
FIG. 3 is a multiple vibrating point-based vibroseis acquisition system according to an embodiment of the invention.

Referring to FIG. 3, in accordance with other embodiments of the invention, a vibroseis acquisition system 100 may be used in placed of the vibroseis acquisition system 20 of FIG. 2. Unlike the system 20, the system 100 includes multiple vibrating points 140, which replace the single vibrating point 40 of FIG. 2. Like reference numerals have been used in FIG. 3 to label corresponding components that are similar to those discussed in connection with FIG. 2. A controller 110 of the acquisition system 100 controls the multiple vibrating points 140 for purposes of causing each vibrating point 140 to inject a sweep sequence into the earth via an associated signal 141. The signals 141, in turn, produce corresponding signals 142 that are sensed and recorded by the receivers 60 to form corresponding seismic measurements. It is noted that the vibrating points 140 may be formed from multiple seismic vibrator trucks, in accordance with some embodiments of the invention or may be formed from borehole-disposed vibrators, in accordance with other embodiments of the invention. With the system 100, each vibrating point 140 has a different associated sweep rate.

The acquired seismic measurements may be combined in a receiver gather or common midpoint gather (as non-limiting examples), which suppresses the harmonics while strengthens the described seismic signal, as the signal stays coherent. After the gather has been performed, a noise attenuation technique, such as a least squares random noise attenuation technique, may be used to further attenuate the harmonics.

Figure 4:
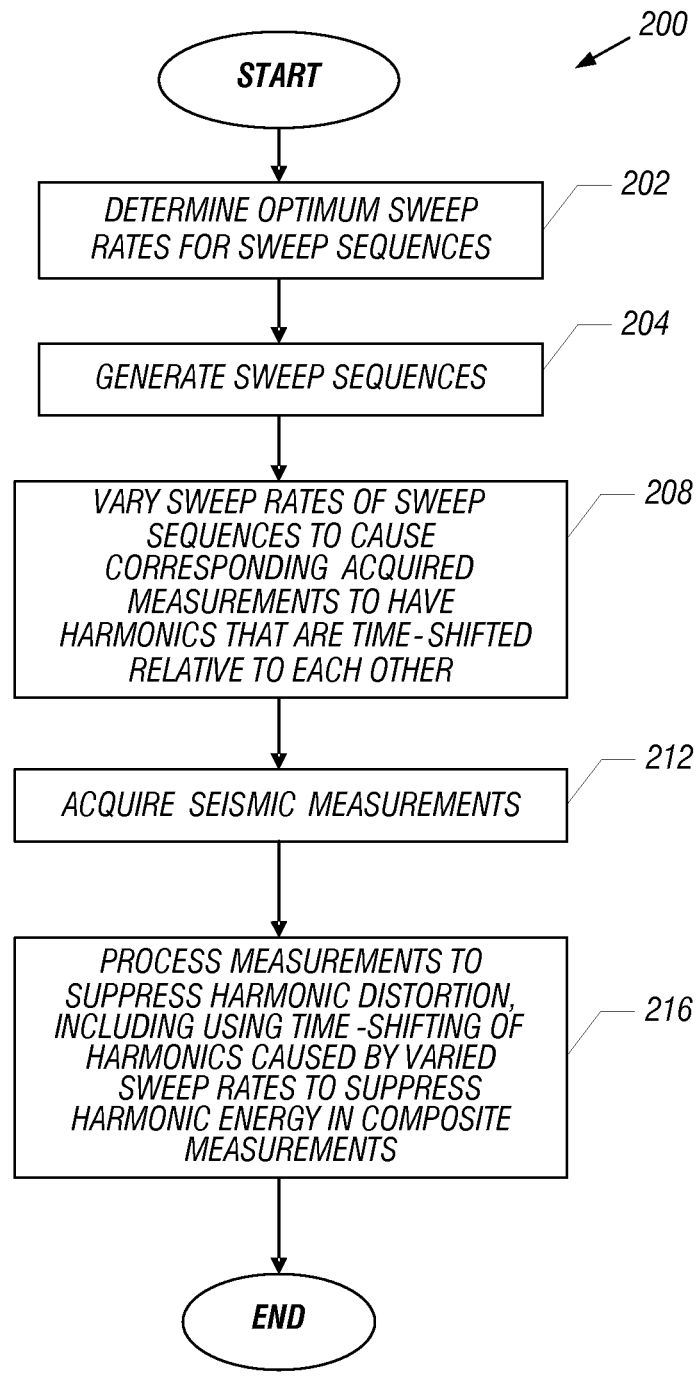
FIG. 4 is a flow diagram depicting a harmonic attenuation technique according to embodiments of the invention.

Referring to FIG. 4, to summarize, a technique 200 may be used, in general, to suppress, or attenuate, harmonics in seismic measurements that are acquired in a vibroseis survey. Pursuant to the technique 200, optimum sweep rates may first be determined for sweep sequences to be used in the survey, pursuant to block 202. In accordance with some embodiments of the invention, an evolutionary technique or simulated annealing technique (as non-limiting examples) may be applied for purposes of determining optimum sweep rates. In other embodiments of the invention, however, the sweep rates may be varied over a predefined range (either randomly, pseudo randomly or pursuant to a predetermined schedule, as a non-limiting example) and thus, block 202 may not be performed.

Pursuant to the technique 200, the sweep sequences are generated (block 204), and the sweep rates are varied (block 208) to cause the corresponding acquired seismic measurements (block 212) to have harmonics that are time-shifted relative to each other (i.e., the harmonics in each measurement are time-shifted relative to the harmonics in each of the other measurements). The acquired seismic measurements are processed (block 216) to suppress harmonic distortion, including using the time shifting of the harmonics that are caused by the varied sweep rates to suppress, or attenuate, the harmonic energy in the composite measurement.

Figure 5:
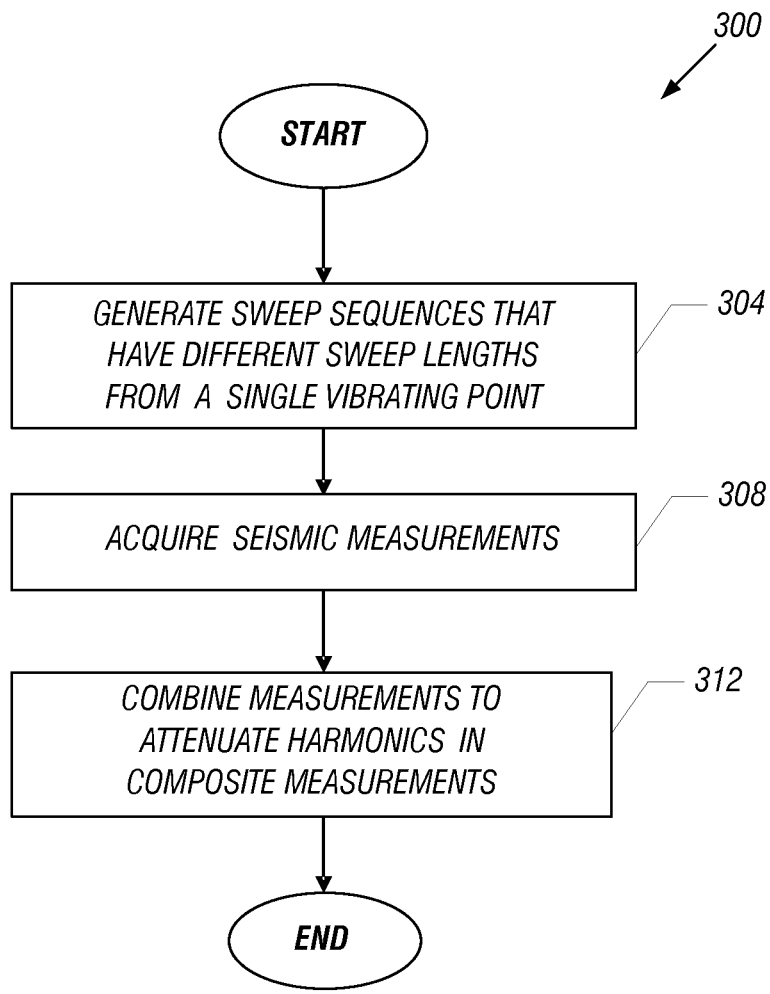
FIG. 5 is a flow diagram depicting a harmonic attenuation technique using the single vibrating point-based vibroseis acquisition system of FIG. 2 according to an embodiment of the invention.

FIG. 5 depicts a generalized technique 300 that may be used with a single vibrating point. Pursuant to the technique 300, sweep sequences that have different sweep lengths are generated from a single vibrating point, pursuant to block 304. Seismic measurements are acquired (block 308), and the measurements are combined (block 312) to attenuate harmonics in the composite measurement.

Figure 6:
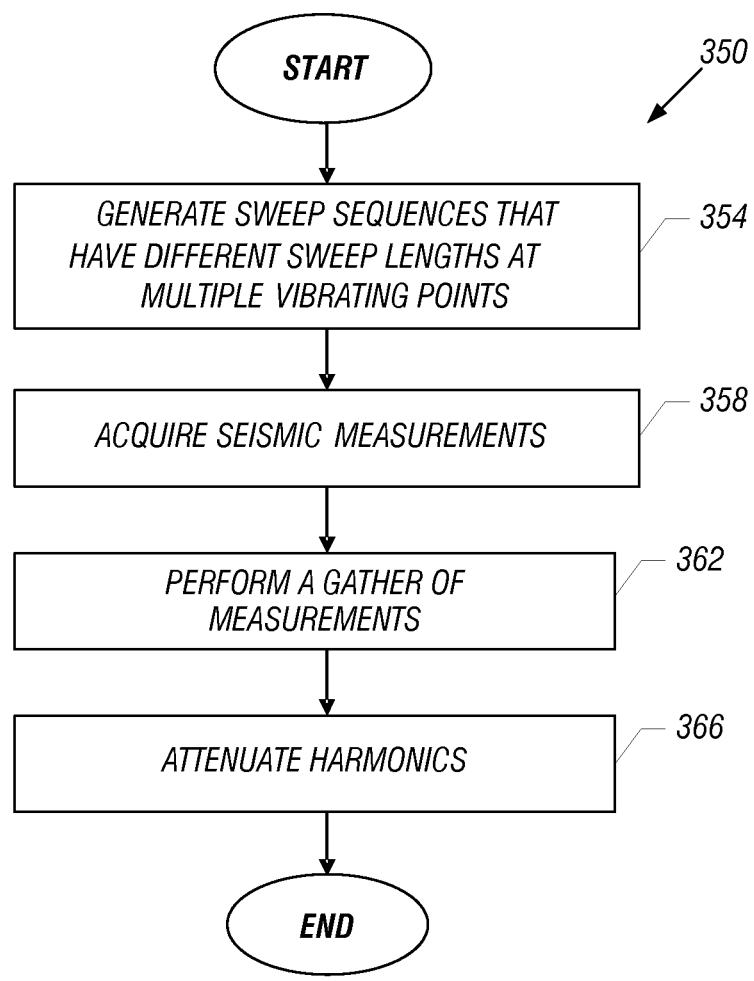
FIG. 6 is a flow diagram depicting a harmonic attenuation technique using the multiple vibrating point-based vibroseis acquisition system of FIG. 3 according to an embodiment of the invention.

For embodiments of the invention in which a vibroseis survey contains multiple vibrating points, a technique 350 that is depicted in FIG. 6 may be performed. Pursuant to the technique 350, sweep sequences are generated (block 354) that have different sweep lengths at multiple vibrating points. Seismic measurements are acquired (block 358), and then a gather (a common midpoint gather, for example) is performed, pursuant to block 362. The data may be further processed, such as by a least squares method (as a non-limiting example) to further attenuate the harmonics, pursuant to block 366.

Figure 7:
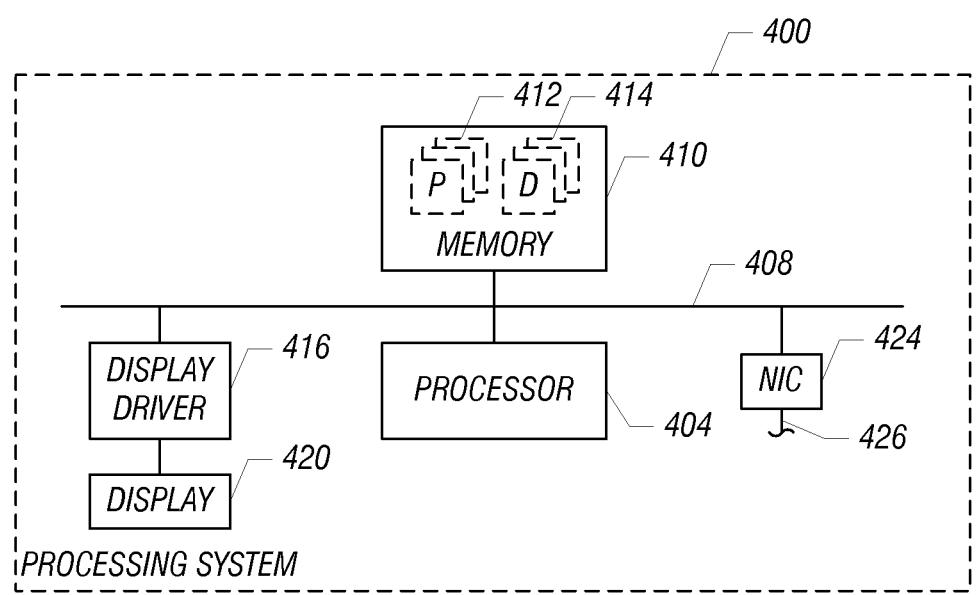
FIG. 7 is a schematic diagram of a processing system according to an embodiment of the invention.

Referring to FIG. 7, in accordance with some embodiments of the invention, the measurements that are acquired by the receivers 60 (see FIGS. 2 and 3) may be processed by a processing system 400. In general, the processing system 400 may include at least one processor 404, such as a microcontroller or microprocessor. In general, the processor 404 may be coupled through one or more buses 408 to a memory 410, which stores various programs 412 and datasets 414. The programs 412 may, when executed by the processor 404, cause the processor 404 to combine the measurements and use the time shifting of the sweep sequences to attenuate harmonics in the composite measurements. It is noted that, depending on the particular embodiment of the invention, the processor 404 may, in response to executing the instructions, process the acquired measurements, depending on whether a single vibrating point or multiple vibrating points were used. Thus, in general, the processor 404 may apply the techniques 100 (see FIG. 3), 200 (see FIG. 4), 300 (see FIG. 5) and 350 see FIG. 6) that are described herein. Intermediate processing results may be stored as the datasets 414 in the memory 410.

It is noted that FIG. 7 depicts merely an example of one out of many possible architectures for the processing system 400. Thus, many variations are contemplated and are within the scope of the appended claims. For example, in accordance with other embodiments of the invention, the processing system 400 may be a distributed processing system and thus, may include processing subsystems that are connected together and may be located in different locations.

For the processing system 400 that is depicted in FIG. 7, the processing system 400 may also include a display driver 416 that drives a display 420 for purposes of displaying the results of the processing by the processor 404. As examples, the display 420 may display frequency spectra of the acquired measurements, as well as frequency spectra of the measurements when combined to attenuate harmonics. Additionally, as depicted in FIG. 7, the processing system 400 may include interfaces to communicate with other computer and/or processing systems, such as a network interface card (NIC) 424, which is connected to a network 426.

Figure 8:
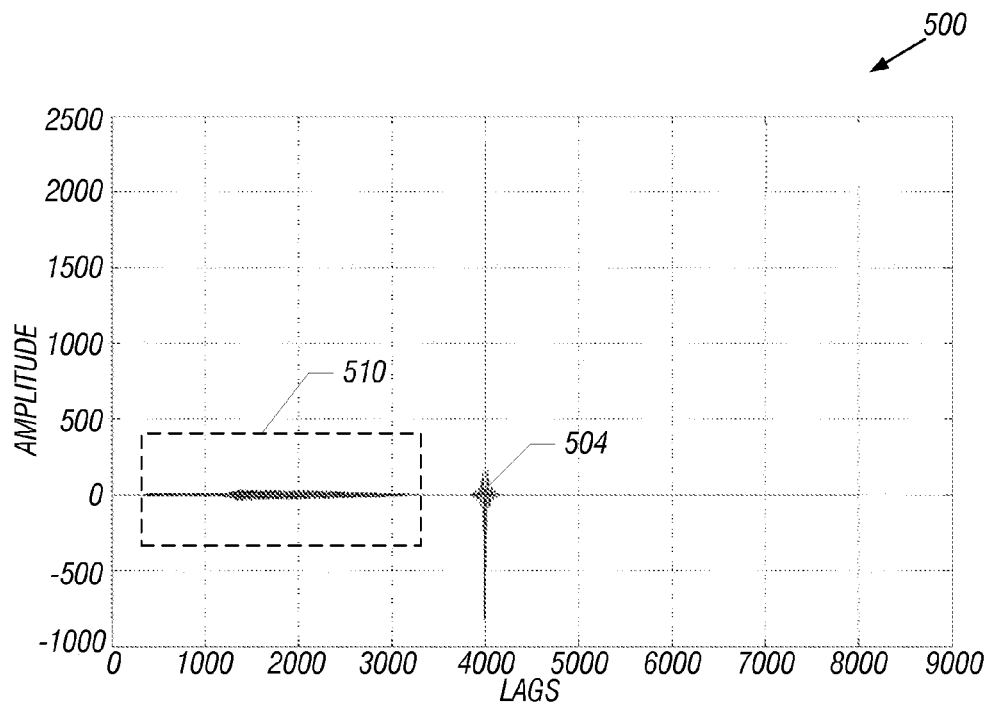
FIGS. 8, 9, 10 and 11 are graphs depicting frequency spectra of simulated seismic measurements according to embodiments of the invention.
Figure 9:
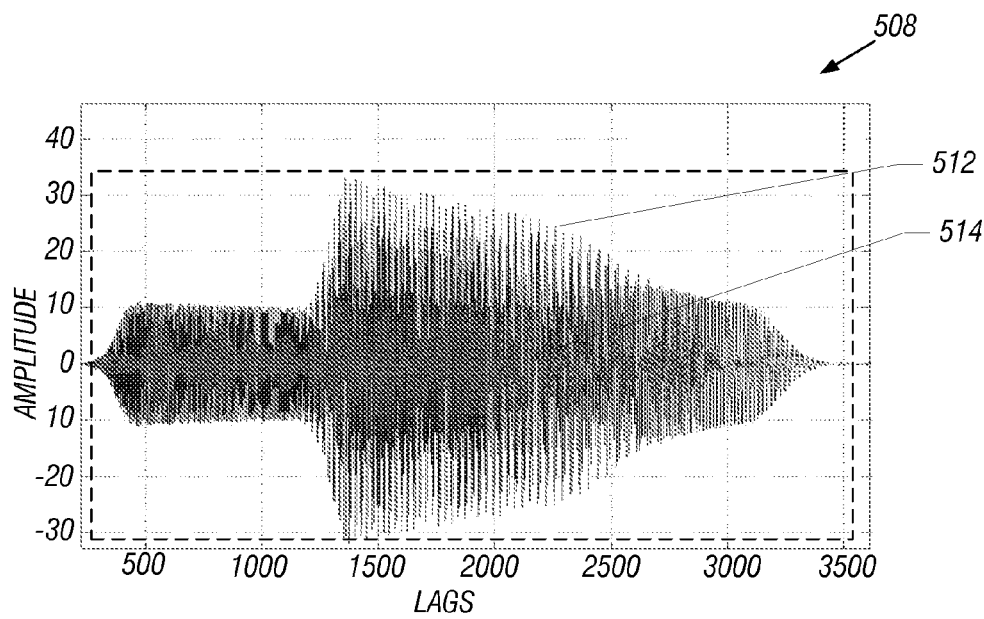

FIGS. 8 and 9 depict the results of a simulation that was based on the generation of four sweep sequences that had varied sweep rates. More specifically, FIG. 8 depicts a graph 500 that illustrates the composite signal produced by stacking the simulated acquired measurements in response to the sweep sequences. The graph 500 also depicts a simulated measurement acquired in response to a single sweep sequence that had a sweep length equal to the average length of the four sweep sequences. As shown in the graph 500 at the reference numeral 504, a main event, varied sweep rate, occurred for all five sweep sequences at lag 4000. The five sweep sequences also produced harmonics in the region denoted by the dashed box 510, which is illustrated in more detail in FIG. 9. Referring also to FIG. 9, harmonic energy 514 resulting from the four stacked measurements attained from the varied sweep rate sweep sequences was significantly less than harmonic energy 512 resulting from the measurement obtained in response to the single sweep sequence.

Figure 10:
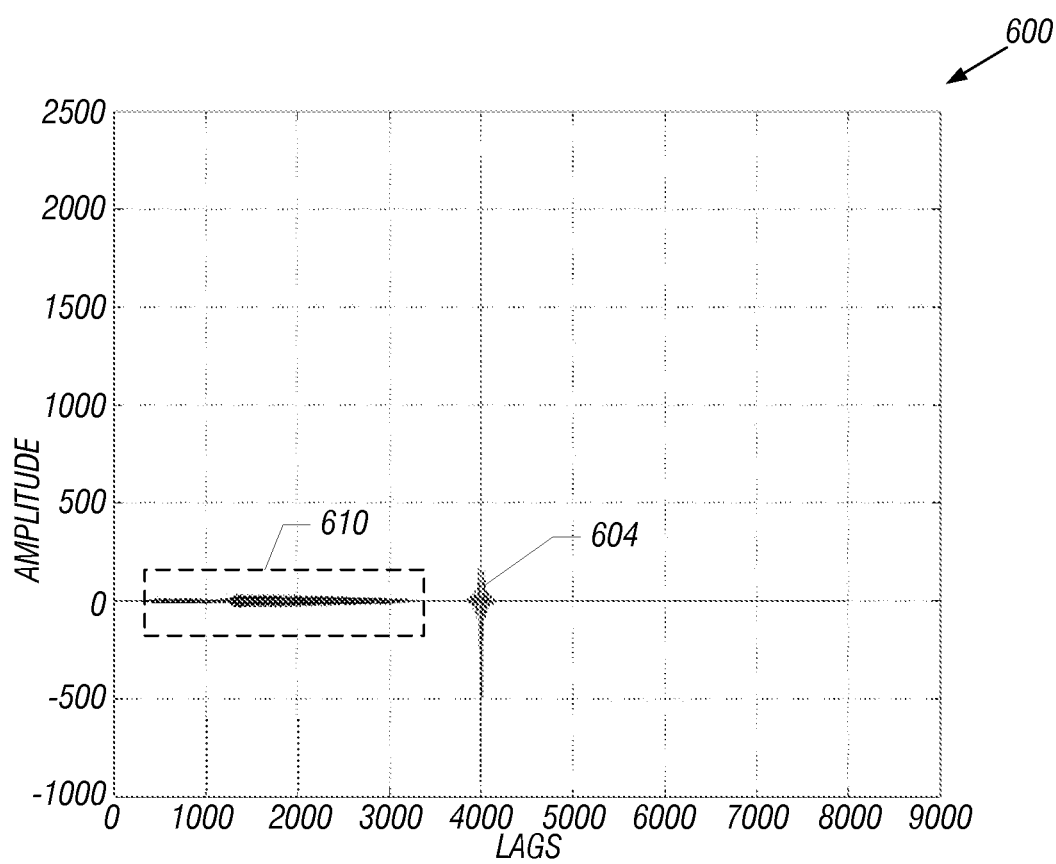
Figure 11:
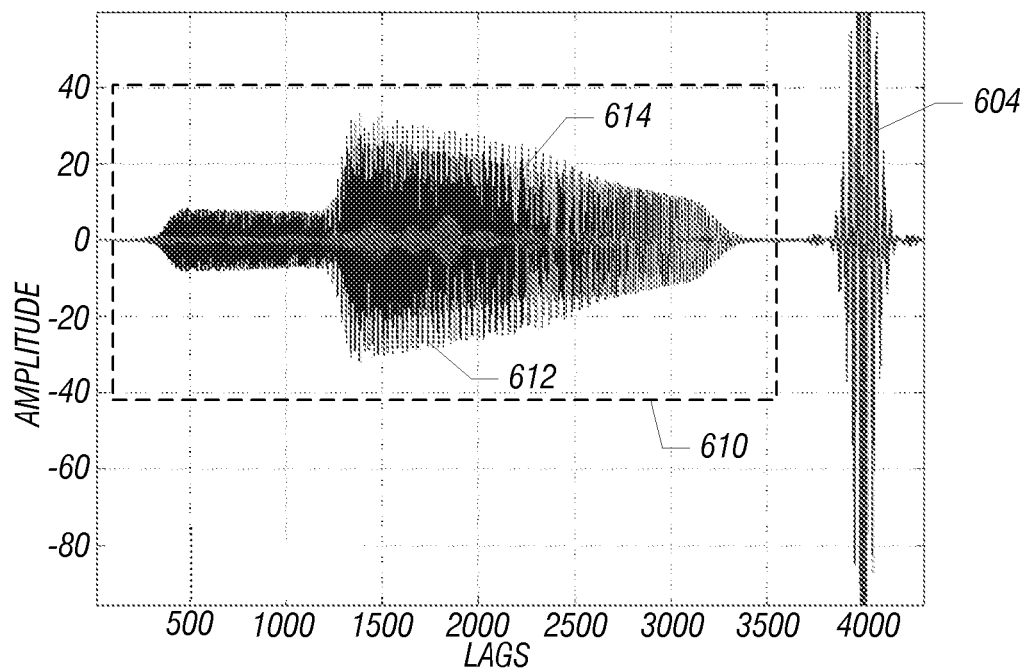

FIG. 10 depicts a graph 600 depicting the results of a simulation that was based on the generation of a single sweep sequence and the generation of 100 sweep sequences that had varied sweep lengths. In this simulation, each of the 100 sweep sequences had a basic sweep length of ten seconds, and a varied duration of "+/−δ," which for the simulation was a random number with a standard deviation of 0.2 seconds. The measurements produced by the 100 sweep sequences were stacked, and each record was correlated with its respective pilot sweep before the stacking. The single sweep had a length equal to the average length of the 100 sweep sequences. Harmonics were added to the simulation for purposes of observing how well the harmonics were suppressed after being stacked. As depicted in FIG. 10, the 100 sweep sequences and the single sweep sequence produced a main event at lag 4000, as depicted at reference numeral 604 in FIG. 11. The records also depict harmonic energy as shown in dashed box 610 in FIG. 10. Referring to FIG. 11, which shows the harmonic energy in dashed box 610 in more detail, the composite record created by stacking the 100 records resulted in harmonic energy 614 that was significantly less than harmonic energy 612 obtained via the single sweep sequence.

Many variations are contemplated and are within the scope of the appended claims. For example, in accordance with some embodiments of the invention, an acquisition system (a wellbore system, for example) may include a seismic spread that includes a relatively small vibrator that is permanently or semi-permanently located at the same vibrating point (i.e., is located at the same vibrating point for a long time such as days, months or years) and injects a multitude of sweep sequences, with each sequence having a different sweep rate. The different sweep rates may be stored and taken into account when the corresponding acquired seismic data are processed.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
    operating vibrators to generate seismic sweep sequences, each of the seismic sweep sequences having an associated sweep rate; and
    varying the sweep rates to reduce harmonic distortion present in a composite seismic measurement produced in response to the sweep sequences.

2. The method of claim 1, further comprising:
    acquiring seismic measurements, each seismic measurement being associated with a different one of the sweep sequences; and
    processing the acquired seismic measurements to produce the composite seismic measurement.

3. The method of claim 2, wherein the processing comprises stacking the acquired seismic measurements.

4. The method of claim 2, wherein the processing comprises performing a common gather.

5. The method of claim 2, wherein the processing comprises applying a random noise attenuation technique.

6. The method of claim 5, wherein the processing comprises applying a least squares noise attenuation technique.

7. The method of claim 1, wherein the act of operating the seismic vibrators comprises generating the seismic sweep sequences comprises generating the seismic sweep sequences from different vibrating points.

8. The method of claim 1, wherein the act of operating the vibrators to generate the seismic sweep sequences comprises generating the seismic sweep sequences at the same vibrating point.

9. The method of claim 1, wherein the act of operating the vibrators to generate the seismic sweep sequences comprises generating the seismic sweep sequences in a composite sweep sequence.

10. The method of claim 9, wherein the act of operating the vibrators to generate the seismic sweep sequences in a composite sweep sequence comprises generating the sweep sequences sequentially and varying the lengths of the sweep sequences.

11. The method of claim 1, wherein the act of operating the vibrators to generate the seismic sweep sequences comprises varying lengths of the sweep sequences.

12. The method of claim 9, wherein the act of using the vibrators to generate the seismic sweep sequences comprises generating the sweep sequences from a permanently or semi-permanently positioned vibrating point.

13. A method comprising:
    receiving seismic data indicative of seismic measurements acquired in response to a plurality of seismic sweep sequences, each of the seismic sweep sequences having an associated sweep rate and the sweep rates being varied; and
    processing the seismic measurements in a machine to produce a composite seismic measurement and using the varied sweep rates to suppress harmonic distortion otherwise present in the composite seismic measurement.

14. The method of claim 13, wherein the processing comprises stacking the acquired seismic measurements.

15. The method of claim 13, wherein the processing comprises performing a common gather.

16. The method of claim 13, wherein the processing comprises applying a random noise attenuation technique.

17. The method of claim 16, wherein the processing comprises applying a least squares noise attenuation technique.

18. The method of claim 2, wherein the varying comprises varying the sweep rates to time shift harmonics in each of the measurements relative to the harmonics in each of the other measurements.

19. The method of claim 13, wherein the processing relies on time shifting of harmonics in each of the measurements relative to harmonics in each of the other measurements.

* * * * *